United States Patent [19]
Schall

[11] 3,862,676
[45] Jan. 28, 1975

[54] CLUTCH CONTROLLED BY ENGINE SPEED AND TORQUE

[75] Inventor: Myron M. Schall, Toledo, Ohio

[73] Assignee: Dana Corporation, Toledo, Ohio

[22] Filed: Feb. 28, 1974

[21] Appl. No.: 446,882

[52] U.S. Cl. ........... 192/.032, 192/.076, 192/105 F, 192/109 F, 137/51, 137/625.66, 192/113 B
[51] Int. Cl. .......................................... F16d 43/284
[58] Field of Search ............. 192/.032, .076, 109 F, 192/103 F, 103 FA, 105 F, 85 R

[56] References Cited
UNITED STATES PATENTS

| | | | |
|---|---|---|---|
| 2,893,526 | 7/1959 | Smirl | 192/85 R X |
| 3,263,782 | 8/1966 | Smirl et al. | 192/85 R X |
| 3,351,169 | 11/1967 | McIndoe | 192/113 B X |
| 3,466,950 | 9/1969 | Mummert | 192/109 F X |
| 3,625,322 | 12/1971 | Nagamatsu | 192/103 FA |

*Primary Examiner*—Benjamin W. Wyche
*Attorney, Agent, or Firm*—Robert E. Pollock

[57] ABSTRACT

A fluid control system for actuating a master clutch has a variable pressure regulator valve which operates in response to engine speed and engine load. The variable fluid pressure is delivered to a clutch actuating piston to regulate the magnitude of actuating pressure for operating the clutch. Fluid directed away from the clutch actuating piston is used to provide cooling for the clutch. A clutch dump valve is incorporated in the control system to completely disengage the clutch making gear ratio shifts. To alleviate clutch drag, the controls are such as to also dump the clutch lube oil when the clutch is in neutral and when the clutch is disengaged during transient transmission ratio shifts.

4 Claims, 3 Drawing Figures

3,862,676

CLUTCH CONTROLLED BY ENGINE SPEED AND TORQUE

BACKGROUND OF THE INVENTION

1. Field of Invention

The present invention relates to an automatic clutch and more particularly to such a clutch having a control system for automatically controlling it for smooth automatic engagement in a vehicle driveline.

2. Description of the Prior Art

Control systems are known for automatically operating fluid actuated master clutches in which engagement is controlled by a variable pressure derived from the rotational speed of a vehicle engine and the torque load applied to such an engine so that a regulated rate of pressure can be produced for operating the clutch. Such arrangements are shown in U.S. Pat. No. 2,663,393 which issued Dec. 22, 1953 to W. T. Livermore and 2,853,167 which issued Sept. 23, 1958 to O. K. Kelley. Also, a control system for such a clutch wherein a dump valve is used for dumping fluid during gear shifting and dumping the cooling lubricant when released can be found in U.S. Pat. No. 3,351,169 which issued Nov.7, 1967 to R. M. McIndoe. While numerous other control systems have been proposed in the past utilizing these features, none has provided a satisfactory control system whereby all valves cooperate in a simple and satisfactory manner to produce an automatic control system for operating a master clutch.

SUMMARY OF THE INVENTION

The present invention provides a control system for a master type friction clutch which is used to connect an engine output shaft to a transmission input shaft for delivering torque therebetween. More specifically, the control system of the present invention carried out the intended purpose through the use of a pressure signal, which increases an engine speed increases, applied to a pressure regulator valve and a second signal acting in cooperation with the first and proportional to the engine power level. These two signals operate in conjunction with each other and act on one end of the variable pressure regulator valve. The resultant valve position controls the amount of oil flow directed to actuating the clutch into frictional engagement. The oil directed away from the actuating position of the clutch is, normally, used to cool the clutch. The control system preferably includes a dump valve which has a dual function in that it serves to dump pressure being directed to the clutch position when the transmission is being shifted between different ratios and also serves to alleviate clutch drag by dumping cooling liquid from the friction clutch when it is in its released condition.

BRIEF DESCRIPTION OF THE DRAWINGS

While the specification concludes with claims which particularly point out what is considered to be the present invention, it is believed that the same will be more readily understood from the following description of a preferred embodiment of the present invention when read in conjunction with the accompanying drawings, in which:

DESCRIPTION OF THE PREFERRED EMBODIMENT

Figure 1:
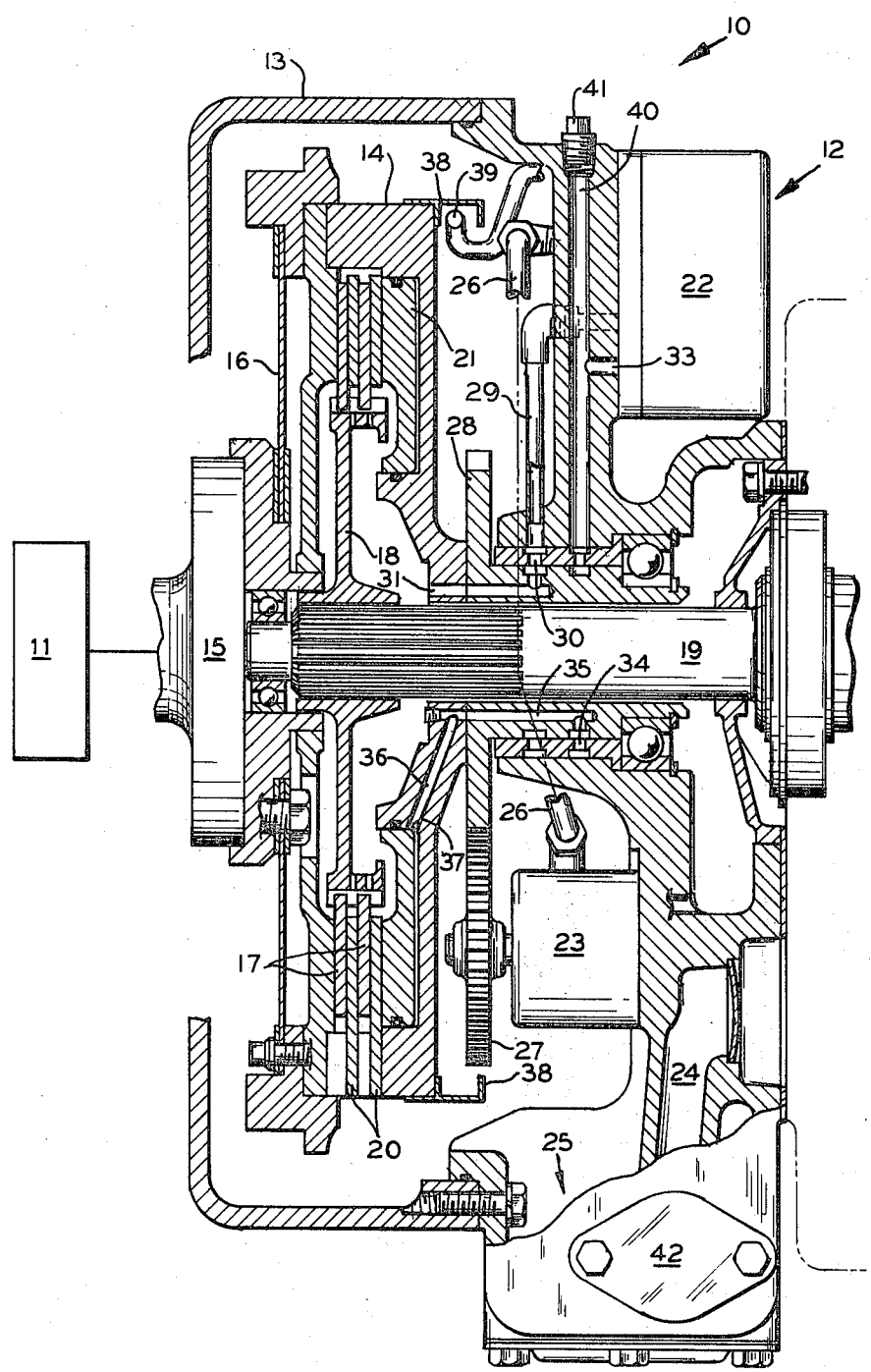
FIG. 1 is a partial vertical cross sectional view of the clutch structure and a schematic representation of portions of the control system therefor.

Referring now to the drawings and more particularly to FIG. 1, a master clutch is shown generally at 10 for transmitting torque from a throttle controlled internal combustion engine 11 to a multiple speed mechanical transmission (only portions of which are shown). A hydraulic control system, designated generally by the numeral 12, is provided for automatically regulating the rate and degree of application of the master clutch 10 in response to engine speed and load. By this arrangement, the need for a clutch pedal is eliminated. The master clutch 10 with its associated controls 12 functions in the manner of variable engagement fluid coupling and serves as means for maneuvering and starting the vehicle in response to actuation of the throttle pedal.

The clutch is of the type well known in the art adapted for engagement by connection to a source of fluid pressure. In the preferred embodiment illustrated, the master clutch 10 is of the multiple friction disc type and is located in a housing 13. The flywheel 14 is attached to an engine output flange 15 through a series of drive straps 16 so as to rotate at engine speed. The clutch 10 includes a plurality of friction disc members 17 splined to a clutch driven member 18 which is drivingly connected to the transmission input shaft 19. Separator plates 20 are interleaved with discs 17 and splined to the interior of the flywheel 14 in a well known manner. A clutch actuating piston 21 is contained within the housing 13 and is adapted to apply engaging pressure to the clutch disc members 17, 20 for clamping the same to the same flywheel 14 and thereby establish a torque transmitting relationship between the engine 11 and transmission input shaft 19.

The housing 13 is adapted to be secured between the engine 11 and transmission and serves as the hydraulic oil sump for retaining the oil to be used for the control system 12 and also for cooling purposes as will be discussed hereinafter. Preferably mounted to or integral with the housing 13 is a valve body 22 housing the valving of the clutch control system 12.

A source of fluid pressure for actuating the clutch is also provided. In the preferred embodiment, and as illustrated, this comprises a pump 23 mounted within the clutch housing 13. Preferably, the pump 23 is a gear pump having a suction conduit 24 in communication with an oil sump 25 in the housing 13. A discharge conduit 26 delivers fluid from the pump 23 to the valve body 22. The pump 23 is driven at engine speed via gear 27 drivingly connected to gear 28 which is, in turn, drivingly connected to the flywheel 14.

Oil supplied by pump 23 flows to the control system 12 and a portion of said oil is discharged through conduit 29 which delivers oil to cool the clutch friction discs members 17 via radial passageways 30 and axial passageway 31. Oil supplied by pump 23 also is directed, by the action of controls 12 as will hereinafter more fully be described, through the discharge conduit 33 radial passageway 34, axial passageway 35 and generally radial passageway 36 to the cavity 37 behind the clutch actuating piston 21 to control the rate of application of pressure to the clutch actuating piston 21.

It will be seen from the foregoing that engine torque is transmitted from the engine 11 to the flywheel 14 and upon actuation of the clutch piston 21 to the transmission input shaft 19 by controlling the magnitude of the force applied by the piston 21 to the clutch discs members 17 through the control system 12. This torque is transmitted to the head end gears of the transmission 14 by the transmission drive gear integral with the transmission input shaft 26.

Affixed to the flywheel 14 is a shroud 38 which extends around the full circumference of the flywheel 14. The shroud 38 is so located that it carries oil from the sump 25 up and into sensing impact with the pitot tube 39. In this way, pressure in the pitot tube results from and is a direct function of engine speed.

Oil is supplied to the clutch housing 13 through an oil fill passageway 40 which is normally closed with plug 41. An oil drain 42 is provided at a convenient low spot in the sump 25.

CONTROL SYSTEM

Figure 2:
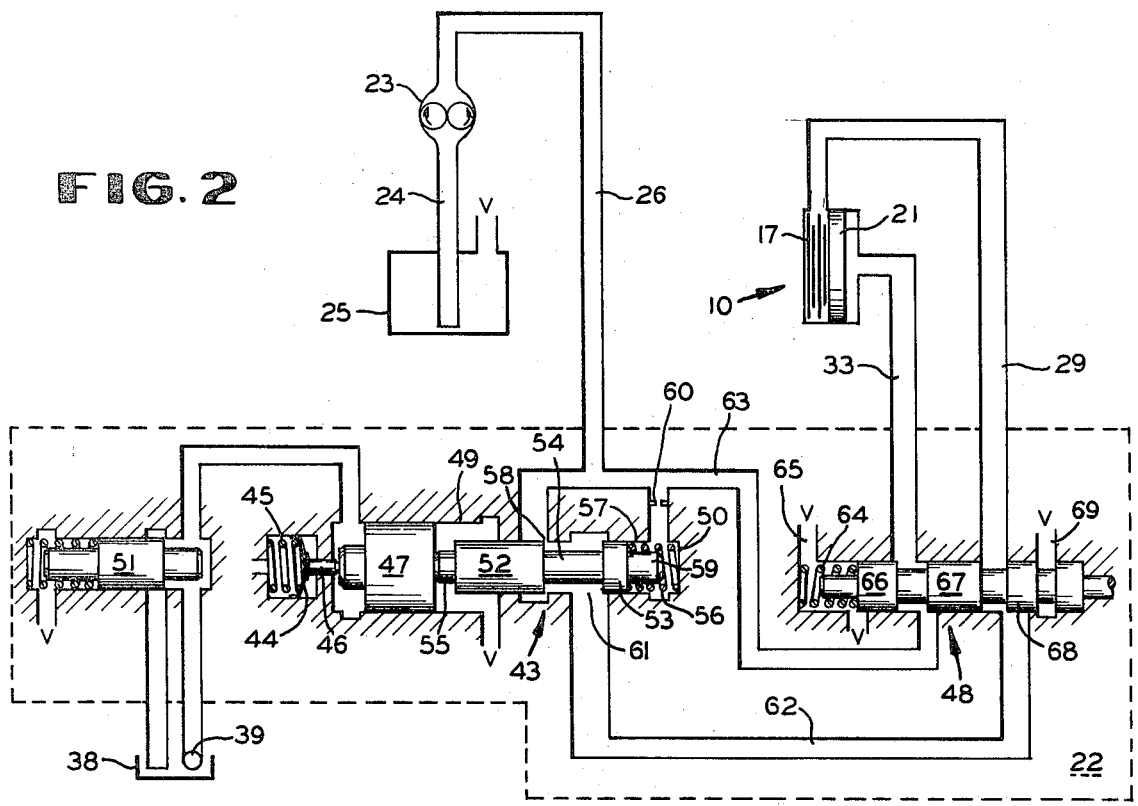
FIG. 2 is a schematic diagram of the hydraulic control valve circuit for the modulated clutch of the present invention; and, FIG. 3 graphically shows a typical pressure speed curve for the control valve.

The improved hydraulic control system 12 of the present invention is shown schematically in FIG. 2. The system includes valving designed to cooperate with the clutch actuating piston 21 in a manner to provide smooth engagement of the master clutch 10 in addition to selective cooling of the clutch friction discs 17.

It is highly desirable that oil pressure acting on the clutch actuating piston 21 be applied to a degree which varies according to both the speed of the engine 11 and the load on the engine 12 in order to minimize shock loads and vehicle jerk during clutch engagement.

In the present control system, the above is accomplished by means of a variable pressure regulator valve 43 which is acted upon by a pressure signal which is a function of speed of the engine 11 from a pitot tube 39 and an engine load sensitive device such as vacuum bellows 44. The bellows 44 contains an internal compression spring 45 which normally biases the output rod 46 to the right as shown in FIG. 2, thereby urging the piston 47 and pressure regulator valve 43 to the right. The interior of the bellows 44 is in communication with the engine manifold vacuum. As is well known, in a spark ignited internal combustion engine, the engine manifold vacuum is inversely proportional to engine load. Therefore, low engine speed (as sensed by pitot tube 39) and low engine load (as sensed by bellows 44) result in a low force acting on the left end (as shown) of piston 47 and pressure regulator valve 43. The cavity 49 is vented to atmosphere and can be disregarded for purposes of analysis of the operation of the system.

It should be mentioned that, with diesel engines, the equivalent of engine manifold vacuum is not a satisfactory indication of engine load. For diesel applications, a mechanism is provided to move the rod 46 rightward upon increasing application of the engine throttle.

The bellows 44, piston 47, pressure regulator valve 43 and clutch dump valve 48 are all located within a unitary valve body 22. The valve body 22 includes a stepped bore 50 for receiving the piston 47, the bellows 44 and the regulator valve 43. The piston 47 is located in the intermediate portion of bore 50. The body also includes passageways operatively connecting the various elements therewithin and can also include provisions for additional optional elements such as the pressure relief valve 51 associated with the pitot tube 39.

The regulator valve 43 is formed with a pair of lands 52 and 53 and a reduced diameter portion 54 therebetween. The left end of the regulator valve 43 has an axial stem 55 for engagement with the adjacent face of the transfer piston 47. A regulator spring 56 engages the end of bore 50 and reacts against regulator valve 43 to normally urge the same to the left against the transfer piston 47. A plurality of ports are provided which open to the bore 57 housing the regulator valve 43. An annular port 58 is provided at one end and is in open communication with the conduit 26 through which oil is supplied by the pump 23. Oil from the pump 23 is also in communication with the right hand end (opposite the bellows 44 and piston 47) of the valve 43, the line therebetween including surge limiting restrictor 60. Valve end 59 serves, in the known manner, to limit overtravel of the valve 43. An intermediate port 61 communicates with passageway 62 which carries oil to the lube line portion of clutch dump valve 48. Similarly, passageway 63 communicates between conduit 26 and the clutch engagement portion of clutch dump valve 48.

The clutch dump valve 48 is normally biased to the right (to the position shown in FIG. 2) by spring 64 located within vented cavity 65. With the valve 48 in this position, oil for clutch actuation flows through passageway 63, between valve lands 66, 67 and to conduit 33 to actuate the clutch. Similarly, clutch lube oil flows through passageway 62, between lands 67, 68 on valve 48 and to the lube oil conduit 29 to lubricate the clutch. Upon shifting of the body of clutch dump valve 48 to the left by any suitable means such as a solenoid valve (not shown) passageway 63 is blocked by land 67 and conduit 33 is in communication with vent port 65 thereby venting the clutch actuating pressure. At the same time land 68 shifts such as to block communication between passageway 62 and conduit 29 and establish communication between passageway 62 and vent port 69. By this action, the clutch is fully disengaged and the clutch lubrication is dumped, thereby eliminating the viscous drag resulting from the application of clutch lubrication.

The pressure regulator valve 43 actuates the clutch 10 by allowing a controlled flow of oil to the clutch lubricating conduit 29 through port 58. The portion of the oil flow from the pump 23 not going to lubrication is used to pressurize the cavity 37 thereby actuating the clutch 10. This arrangement is extremely simple and provides the additional benefit that lubricating oil flow is high when clutch actuating pressure is low and therefore clutch slippage and cooling requirements are high.

Operation of the clutch and controls of the present invention is as follows: When the vehicle is at rest and the transmission in neutral the clutch dump valve 48 will be shifted to the left and the clutch fully disengaged. Upon shifting the transmission into gear the clutch dump valve 48 will be shifted to the right and the remainder of the controls become functional. With no pressure on the accelerator, engine speed will be low and engine manifold vacuum high. Under these conditions the forces created by the pitot tube 39 and bellows 44 are not sufficient to overcome the force of spring 56. Consequently, port 58 is wide open and oil flows freely therethrough to lubricating oil conduit 29. Because this flow path is relatively free of obstructions, there is little or no pressure in the oil conduits 26, 29 and 33, and the clutch is not actuated.

When the vehicle throttle control is depressed and the engine speed increases the piston 47 and valve 43 are urged to the right by the increased pressure sensed by the pitot tube 39. As this happens, the port 58 slowly closes resulting in a decrease in the flow of oil for lubrication, an increased pressure in conduits 26 and 33 and partial actuation of the clutch 10. The actuation of the clutch, in turn, results in a load on the engine 10 which is reflected in reduced engine manifold pressure, a rightward movement of the rod 46, piston 47 and valve 43, further reduction in the opening of port 58 and further actuation of the clutch 10.

Figure 3:
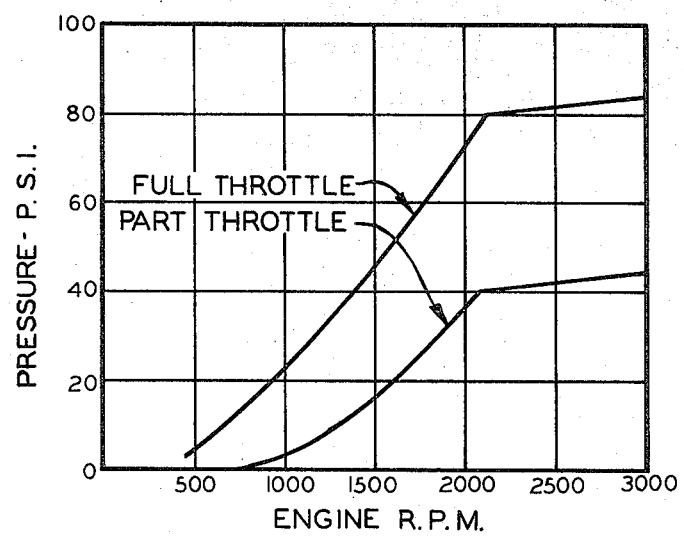

FIG. 3 shows, in graphic form the clutch actuating pressure resulting from operation of the present controls under conditions of part throttle and full throttle. The plateau in the curves results from the limitation in pitot pressure signal resulting from relief valve.

It will be apparent to those skilled in the art that many modifications of the embodiment illustrated may be made without departing from the spirit and scope of the invention.

What is claimed is:

1. In a clutch and controls therefor for incorporation in a vehicle including an engine said clutch adapted for engagement by connection to a source of fluid pressure the improvement comprising:
   a. a pressure regulator valve having an inlet, an outlet, and a means biasing said valve in a first direction wherein said valve is open and said inlet and outlet are in generally free communication;
   b. a bellows member responsive to the vacuum in the manifold of said engine and adapted to bias said valve away from said first position increasingly as the load on said engine increases;
   c. a pitot tube having an impact port located so as to sense engine speed and adapted to bias said valve away from said first position increasingly as the speed of said engine increases; and
   d. a source of fluid for engaging said clutch and in communication with said inlet of said valve whereby when said valve is open said fluid flows through said valve and when said valve is closed said fluid provides a pressure to engage said clutch.

2. The combination of claim 1 wherein said source of fluid comprises an oil pump operating at a speed proportional to engine speed and wherein said fluid is in restricted fluid communication with said valve so as to bias said valve in said first direction.

3. The combination of claim 1 including dump valve means for diverting said fluid from said outlet away from said clutch.

4. The combination of claim 3 wherein said source of fluid comprises an oil pump operating at a speed proportional to engine speed and wherein said fluid is in restricted fluid communication with said valve so as to be bias said valve in said first direction.

* * * * *